July 14, 1931.     G. H. JUMP     1,814,810
CONTROL SYSTEM
Filed Jan. 16, 1930
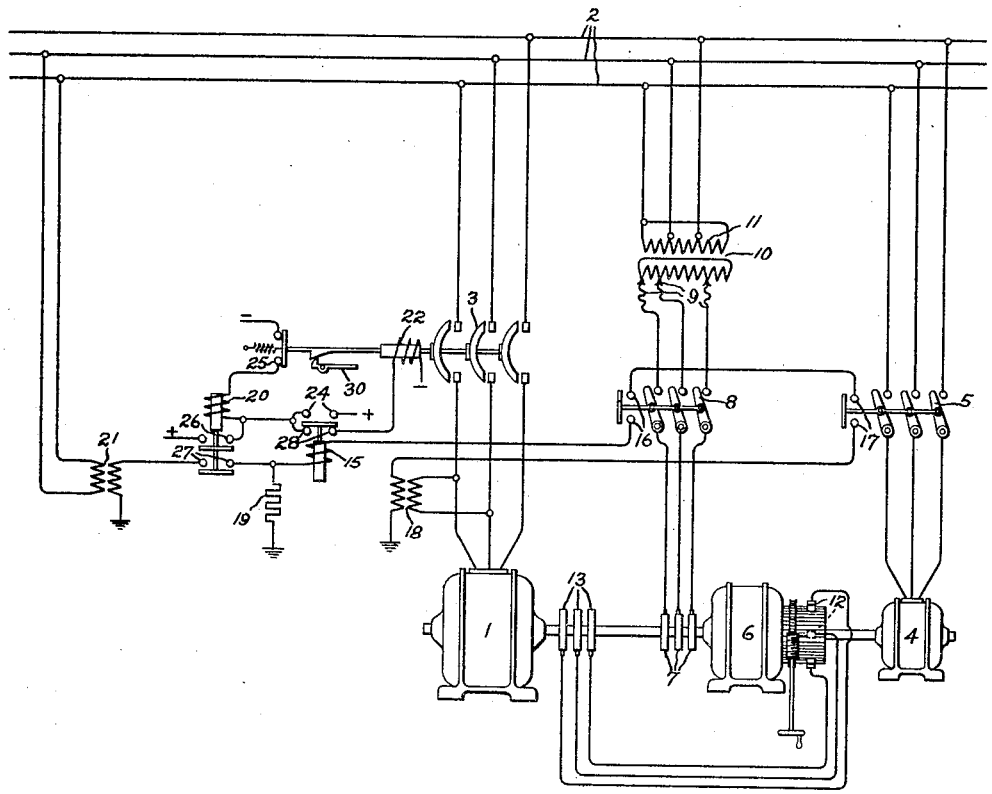
Inventor:
George H. Jump,
by Charles E. Tullar
His Attorney.

Patented July 14, 1931

1,814,810

UNITED STATES PATENT OFFICE

GEORGE H. JUMP, OF BUFFALO, NEW YORK, ASSIGNOR TO GENERAL ELECTRIC COMPANY, A CORPORATION OF NEW YORK

CONTROL SYSTEM

Application filed January 16, 1930. Serial No. 421,282.

My invention relates to control systems for controlling the connection between two electric circuits and particularly to systems for controlling the interconnection of two alternating current circuits of the same frequency in response to the relative phases and magnitudes of the voltages of the two circuits and one object of my invention is to provide an improved arrangement for accomplishing this result.

My invention, for example, may be used in connection with an arrangement for starting a motor-started phase-wound induction motor which is provided with suitable means whereby, during the starting operation, the secondary winding of the induction motor is excited by current of slip frequency while the primary winding remains disconnected from the supply circuit. With such an arrangement, the voltage induced in the primary winding of the motor has the same frequency as the supply circuit but its magnitude or phase or both may differ considerably from the phase and magnitude of the supply circuit voltage. It is desirable, however, to connect the motor primary winding to the line only when the voltages are substantially equal and in phase and I provide, in accordance with my invention, an inexpensive and reliable arrangement for controlling the connection between the motor circuit and the supply circuit so that they are interconnected only when the vectorial voltage difference is less than a predetermined amount.

My invention will be better understood from the following description when taken in connection with the accompanying drawing and its scope will be pointed out in the appended claims.

Referring to the accompanying drawing which illustrates diagrammatically a starting arrangement for a motor-started phase-wound induction motor embodying my invention, 1 represents a polyphase phase-wound induction motor, the primary winding of which is arranged to be connected to a polyphase supply circuit 2 by means of a suitable circuit breaker 3. For starting the motor 1 a starting motor 4 is provided which is arranged to be connected to the supply circuit 2 by means of a switch 5 and which is arranged to drive the rotor of the motor 1 at substantially synchronous speed.

The motor 1 may be provided with any suitable means, examples of which are well known in the art, whereby the secondary winding of the motor 1 may be excited by current of slip frequency during the starting operation of the motor so that the voltage induced in the primary winding of the motor, before the switch 3 is closed, has the same frequency as the supply circuit 2. One arrangement which may be used for accomplishing this result is the well known Scherbius system of control. While in practice I prefer to use such an arrangement, however, in order to simplify the disclosure of my present invention, since the details of the particular means of obtaining the current of slip frequency does not constitute a part of my invention, I have merely shown the source of slip frequency current as an ordinary ohmic drop exciter 6 the rotor of which is direct connected to the rotors of the motors 1 and 4. The slip rings 7 of the exciter 6 are arranged to be connected to the adjustable secondary taps 9 of a polyphase transformer 10, the primary winding 11 of which is connected to the supply circuit 2. The brushes 12 of the exciter 6, which are adjustable on the commutator of the exciter 6, are connected to the slip rings 13 which, in turn, are connected to the secondary winding of the motor 1.

Since the rotor of the exciter 6 is driven at the same speed as the rotor of the motor 1, the frequency of the voltage across the brushes 12 and slip rings 13 is equal to the slip frequency. Therefore, the frequency of the voltage induced in the primary winding of the motor 1 while the switch 3 is open and the secondary winding of the motor 1 is energized by slip frequency current is equal to the frequency of the supply circuit 2. While the frequencies of the voltages induced in the primary winding of the motor 1 and of the supply circuit 2 may be the same, the terminal voltage of the primary winding of the motor may differ considerably in phase and magnitude with respect to the supply circuit voltage and I provide, in accordance with my invention, an arrangement whereby the switch 3 can be closed only when the voltages are substantially equal and in phase.

In the embodiment of my invention shown in the drawing, my improved arrangement includes a relay 15, the operating winding of which is arranged to be connected by means of the auxiliary contacts 16 on the switch 8, when it is closed, and the auxiliary switch 17 on the switch 5, when it is closed, across the secondary winding of a potential transformer 18, the primary winding of which is connected across one phase of the primary circuit of the motor 1. Connected in series with this winding across the secondary winding of the potential transformer 18 is a suitable current limiting device 19 such as a relatively high resistor.

When the primary voltage of the motor 1 exceeds a predetermined value during the starting operation of the motor 1 after the switches 5 and 8 are closed, the relay 15 operates to complete an energizing circuit for a control relay 20 which, in turn, completes a locking circuit for itself which is independent of the relay 15. The energization of the control relay 20 also connects the winding of the relay 15, independently of the resistor 19, directly in series between the corresponding secondary terminals of the transformer 18 and a transformer 21, the primary winding of which is connected across one phase of the supply circuit 2, so that the winding of the relay 15 is energized in response to the vectorial difference between the supply and motor primary voltages. When these two voltages are substantially equal and in phase so that the vectorial difference between them is below a predetermined small value, the relay 15 is restored to its normal position and completes an energizing circuit for the closing coil 22 of the circuit breaker 3 to effect the connection of the motor 1 to the supply circuit 2.

The operation of the system shown in the drawing is as follows:

When it is desired to place the motor 1 in operation, the switch 5 is closed while the switches 3 and 8 are open. The closing of the switch 5 connects the starting motor 4 across the supply circuit 2 so that the rotors of the motor 1 and of the exciter 6 are brought up to a speed near the normal operating speed of the induction motor 1. The switch 8 is then closed so as to connect the slip rings 7 of the ohmic drop exciter 6 to the adjustable secondary taps 9 of the transformer 10. The secondary winding of the motor 1 is then excited by current of the slip frequency and, therefore, the voltage induced in the primary winding of the motor 1 has the same frequency as the frequency of the supply circuit 2.

The closing of the auxiliary contacts 16 on the switch 8 and the closing of the auxiliary contacts 17 on the switch 5 connects the resistor 19 and the winding of the relay 15 in series across the secondary winding of the potential transformer 18 so that as soon as the voltage induced in the primary winding of the motor 1 builds up to a predetermined value, the relay 15 closes its contacts 24 and completes through the auxiliary contacts 25 on the open circuit breaker 3 an energizing circuit for the winding of the relay 20. The relay 20 by closing its contacts 26 completes a locking circuit for its operating winding which is independent of the contacts 24 of the relay 15 so that when this relay 15 subsequently opens its contacts 24, the relay 20 does not become deenergized.

The relay 20 by closing its contacts 27 connects the winding of the relay 15 in series between the secondary windings of the potential transformers 18 and 21 so that the winding of the relay 15 is now energized in response to the vectorial difference between the primary voltage of the machine 1 and the voltage of the supply circuit 2. If the magnitude or phase difference or both between the two voltages exceed a predetermined amount, the relay 15 remains sufficiently energized after the relay 20 is energized to maintain its contacts 28 open. In case it is necessary to adjust the relative phases and magnitudes of the voltages, this may be done by varying the adjustable taps 9 on the transformer 10 and moving the brushes 12 on the exciter 6.

When the desired phase and magnitude relation exists between the primary voltage of the motor 1 and the supply 2, relay 15 becomes sufficiently deenergized to return to the positon shown in the drawing in which position the relay contacts 28 are closed. The closing of the contacts 28 while the control relay 20 is energized completes an energizing circuit for the closing coil 22 of the circuit breaker 3 so that the motor 1 is connected to the supply circuit 2. The opening of the auxiliary contacts 25 on the circuit breaker 3, when it closes, effects the deenergization of the relay 20 so that it is restored to its normal position. The deenergization of the control relay 20 effects the deenergization of the closing coil 22 of the circuit breaker 3. The deenergization of the closing coil 22, however, does not effect the opening of the circuit breaker 3 since it is held in its closed position by a latch 30.

After the circuit breaker 3 is closed, the switch 5 in the circuit of the starting motor 4 may be opened, if desired, so as to disconnect the starting motor from the supply circuit 2. The opening of the auxiliary contacts 17 on the switch 5 disconnects the winding of the relay 15 from across the secondary winding of the potential transformer 18 so that the relay 15 remains in its de-energized position.

By means of my invention, it will be observed that I am able to use a single relay which can be designed to operate in response to a very small vectorial voltage difference and which, at the same time, can be used to respond to a relatively high voltage without overheating or burning out the winding of the relay. This result is obtained by connecting the high resistance 19 in series with the relay winding when it is connected so as to respond to the relatively high voltage.

Another feature of my improved arrangement is that the circuit breaker cannot be closed in case any of the circuits of the control relays or potential transformers are open. This result is accomplished by arranging the connections so that the closing of the circuit breaker is effected only after the relay 15 has picked up and subsequently dropped out. The picking up of the relay 15 shows that the relay circuit and the circuits of the potential transformer 18 are not open. The dropping out of the relay 15 after the relay 20 is energized shows that the circuits of the potential relay 21 are not open as otherwise the relay 15 would remain in its energized position since it would be energized by the secondary voltage of the potential transformer 18.

From the above description, it will be seen that I have provided a very simple, inexpensive and reliable arrangement for interconnecting any two alternating current circuits of the same frequency in response to the relative magnitudes and phases of the voltages of the two circuits.

While I have, in accordance with the patent statutes, shown and described my invention as applied to a particular system and as embodying various devices diagrammatically indicated, changes and modifications will be obvious to those skilled in the art and I, therefore, aim in the appended claims to cover all such changes and modifications as fall within the true spirit and scope of my invention.

What I claim as new and desire to secure by Letters Patent of the United States, is,—

1. In combination, two alternating current circuits, a relay having a winding connected to one of said circuits so as to be responsive to the voltage thereof, a second relay controlled by said first mentioned relay for connecting said relay winding between said circuits when the voltage of said one of said circuits exceeds a predetermined value so that said first mentioned relay is energized in accordance with the voltage difference between said circuits, and means controlled by said relays for interconnecting said circuits when a predetermined phase and magnitude condition exists between the voltages of said circuits.

2. In combination, two electric circuits, a switch for connecting said circuits, and means for controlling the closing of said switch including an impedance, a relay having a winding connected in series with said impedance across one of said circuits, means responsive to a predetermined energization of said relay winding for connecting said relay winding in series between said circuits, and means responsive to a predetermined subsequent reduction in the energization of said relay winding while it is interconnected between said circuits for effecting the closing of said switch.

3. In combination, two alternating current circuits, a switch for connecting said circuits, an impedance, a relay having a winding connected in series with said impedance across one of said circuits, a second relay, means responsive to a predetermined energization of said relay winding for effecting the energization of said second relay to connect said relay winding in series between said circuits and means controlled by said relays for effecting the closing of said switch when said second relay is energized and the energization of said relay winding is below a predetermined value.

4. In combination, two alternating current circuits, a switch for connecting said circuits, an impedance, a relay having a winding connected in series with said impedance across one of said circuits, a second relay, means responsive to a determined energization of said relay winding for effecting the energization of said second relay to connect said relay winding in series between said circuits and to complete a locking circuit for itself which is independent of said first mentioned relay, electro-responsive means for effecting the closing of said switch, and means responsive to a decrease in the energization of said relay winding to a predetermined value while said second relay is energized for effecting the energization of said electroresponsive means.

In witness whereof, I have hereunto set my hand this 11th day of January, 1930.

GEORGE H. JUMP.

CERTIFICATE OF CORRECTION.

Patent No. 1,814,810. Granted July 14, 1931, to

GEORGE H. JUMP.

It is hereby certified that error appears in the printed specification of the above numbered patent requiring correction as follows: Page 3, line 99, claim 4, for the word "determined" read predetermined; and that the said Letters Patent should be read with this correction therein that the same may conform to the record of the case in the Patent Office.

Signed and sealed this 1st day of September, A. D. 1931.

(Seal)

M. J. Moore,
Acting Commissioner of Patents.